3,745,089
PROTEIN STERILIZATION METHOD OF FIREFLY LUCIFERASE USING REDUCED PRESSURE AND MOLECULAR SIEVES

Emmett W. Chappelle, Baltimore, and Edward Rich, Jr., College Park, Md., assignors to the United States of America as represented by the Administrator of the National Aeronautics and Space Administration
No Drawing. Filed Mar. 5, 1968, Ser. No. 710,621
Int. Cl. C07g 7/02
U.S. Cl. 195—66 R    5 Claims

ABSTRACT OF THE DISCLOSURE

Denaturation of the protein firefly luciferase during sterilization thereof is prevented by heating the protein in contact with certain molecular sieves, and under a reduced pressure of the order of $5 \times 10^{-4}$ millimeters of mercury.

---

The invention herein described was made by employees of the United States Government and may be manufactured and used by or for the Government for governmental purposes without the payment of any royalties thereon or therefor.

This invention relates to the sterilization of the protein firefly luciferase, and more particularly to the sterilization of firefly luciferase under conditions which prevent the denaturation of this protein. Specifically, the invention relates to sterilization of firefly luciferase in contact with certain molecular sieves, and under a high vacuum, whereby denaturation of the protein is prevented.

The utilization of luciferase in life detection techniques has been the subject of considerable experimentation over the past years. This research was based on the light producing reactions of the firefly, and on the fact that all terrestrial life is intimately associated with, and dependent upon, the nucleotide phosphate adenosine-triphosphate (ATP). The bioluminescent reaction occurring in the firefly is the result of the reaction of oxygen with an oxidizable substrate (luciferin) catalyzed by an enzyme (luciferase). In order for this reaction to proceed, the luciferin must first react with the ATP before it can be oxidized for such light production.

For life detection use, all of the ATP is first removed from any of the components of the luciferin-luciferase mixture, after which the mixture is placed in proximity to the suspect area while maintaining a light fast environment. If life is present, the ATP associated therewith will activate the mixture with the resultant light emission. This light can be measured by light monitoring equipment well known to those skilled in the art.

One of the difficulties of the foregoing procedure is that the enzyme luciferase cannot be heat sterilized without destroying its activity when in contact with ATP. Sterilization of proteins by heat has never been successfully accomplished because of the instability of proteins when subjected to heat.

Accordingly, it is an object of the present invention to provide a method for sterilizing the enzyme luciferase without destroying its activity for reaction with ATP.

It is also an object of this invention to permit sterilization of luciferase by heating while retaining a substantial proportion of the activity of luciferase for reaction with ATP.

Other objects of the present invention are apparent from a consideration of the following detailed description and claims.

In general, this invention provides a method for sterilizing the enzyme luciferase while preventing denaturation thereof comprising heating the luciferase under a reduced pressure, and at a temperature and for time sufficient to sterilize same wherein the luciferase is in contact with a molecular sieve selected from the group consisting of those bearing the trade names Sephadex G-25, and Biogel P-300. The pressure must be sufficiently low to prevent complete loss of activity of the luciferase for reaction with ATP.

As mentioned above, the pressure under which the method of this invention is effected should be sufficiently low to prevent complete loss activity of the enzyme luciferase for reaction with ATP. Specifically, when the heating of the enzyme is initiated, the pressure should not exceed $10^{-4}$ millimeters of mercury.

The luciferase should be heated for a time sufficient to sterilize same; however, the time will vary with the molecular sieve used, the temperature employed, and the pressure under which the sterilization ocurs. Specifically, the time required to sterilize the luciferase can vary within the range of 6 hours to 36 hours.

The temperature at which sterilization is effected will vary with the other reaction conditions and with the molecular sieve employed, but will generally be within the range of 120° to 135° centigrade.

The molecular sieves employed in the method of this invention are selected from the group consisting of those bearing the trade names Sephadex G-25 and Biogel P-300. Sephadex G-25 is manufactured by Pharmacia Fine Chemicals, Inc., and is a cross-linked dextran gel with a pore size that corresponds to a protein with a molecular weight of approximately 5000. Biogel P-300, which is manufactured by Bio-Rad Laboratories, is a polyacrylamide gel with pore size corresponding to a protein with a molecular weight of approximately 400,000. Both of these gels are chemically inert. Biogel P series gels are described more fully in price list "S," published Feb. 1, 1967, by Bio-Rad Laboratories, at pages 39–45.

The following example shows the effectiveness of the method of this invention in retaining the activity of firefly luciferase for reaction with ATP after sterilization by heating and contrasts the results obtained with Sephadex G-25 and Biogel P-300 to the results obtained by sterilization of firefly luciferase in contact with other specified materials.

EXAMPLE

The experimental procedure was as follows: 2 ml. of luciferase solution [containing partially purified luciferase, 1 mg. of protein/ml.; luciferin, 0.5 mg./ml.; magnesium sulphate, 0.01 M; and tris buffer (pH 7.4), 0.05 M] was added to separate tubes of Sephadex G-25, Biogel P-300, dextran, bovine serum albumin, and diethylaminoethyl cellulose (DEAE). These five mixtures were quick-frozen in liquid nitrogen and lyophilized for 24 hours. Then, in replicates of three, the following treatments were imposed:
 (1) Storage at −80° C. for 36 hours;
 (2) Exposure in air at 135° C. for 36 hours;
 (3) Exposure to 135° C. for 36 hours with an initial chamber pressure of $5 \times 10^{-4}$ mm. of mercury which rose to $4 \times 10^{-3}$ mm. of mercury during heating.

After these treatments, samples were prepared for assay by the addition of 5 ml. of distilled water. Activities of the samples were then compared on the basis of light emitted when 10 g. of ATP in solution (0.1 ml.) were added to 0.3 ml. of the sample suspension. Results are given in the table.

RETENTION OF ACTIVITY BY FIREFLY LUCIFERASE AFTER HEATING

| Compound added | Retention of activity, percent | | |
|---|---|---|---|
| | Un-heated | Heat plus air | Heat with vacuum |
| Sephadex G-25 | 100 | 0 | 10 |
| Biogel P-300 | 100 | 0 | 40 |
| Dextran | 100 | 0 | 0 |
| Serum Albumin | 100 | 0 | 0 |
| DEAE | 100 | 0 | 0 |

The data shows that the firefly luciferase sterilized under reduced pressure and in contact with Sephadex G-25 and Biogel P-300 retained part of its activity for reaction with ATP, while the firefly luciferase sterilized in contact with dextran, serum albumin and DEAE lost all activity.

A complete description of the preparation of luciferase and luciferin, and their use in the method of detecting terrestrial life, is available in the publication "The Design and Fabrication of an Instrument for the Detection of Adenosinetriphosphate (ATP)," NASA CR-411, March 1966, prepared for the National Aeronautics and Space Administration by Hazleton Laboratories, Inc.

Although this invention has been described with reference to certain specific embodiments thereof, it should be understood that the invention is not to be limited by the specific embodiments except as defined in the appended claims.

We claim:

1. A method of sterilizing firefly luciferase while preventing denaturation thereof comprising heating said luciferase under a reduced pressure initially no higher than $10^{-4}$ millimeters of mercury and at a temperature and for a time sufficient to sterilize same, said luciferase being contained in the pores of a molecular sieve selected from the group consisting of cross-linked dextran gels having a pore size corresponding to a protein and polyacrylamide gels with a pore size corresponding to a protein.

2. The method of claim 1, wherein said temperature is within the range of 120° to 135° C.

3. The method of claim 1, wherein said temperature is 135° C.

4. The method of claim 3, wherein said time is 36 hours.

5. The method of claim 1, wherein said time is within the range of from 6 to 36 hours.

References Cited

Science, vol. 155, Mar. 10, 1967, Chappelle et al., pp. 1287–88.

HOWARD E. SCHAIN, Primary Examiner

U.S. Cl. X.R.

195—103.5 R; 260—112 R